United States Patent
Senn et al.

(10) Patent No.: US 9,358,719 B2
(45) Date of Patent: Jun. 7, 2016

(54) APPARATUS AND METHOD OF PRODUCING PLASTICS MATERIAL CONTAINERS

(75) Inventors: Konrad Senn, Regensburg (DE); Florian Wickenhoefer, Bad Koetzting (DE); Ulrich Lappe, Regensburg (DE)

(73) Assignee: Krones AG, Neutraubling (DE)

(*) Notice: Subject to any disclaimer, the term of this patent is extended or adjusted under 35 U.S.C. 154(b) by 366 days.

(21) Appl. No.: 13/281,453

(22) Filed: Oct. 26, 2011

(65) Prior Publication Data

US 2012/0126456 A1    May 24, 2012

(30) Foreign Application Priority Data

Oct. 26, 2010 (DE) .......................... 10 2010 049 404

(51) Int. Cl.
| | |
|---|---|
| *B29C 35/04* | (2006.01) |
| *B29C 49/64* | (2006.01) |
| *B29C 49/68* | (2006.01) |
| *B29C 49/78* | (2006.01) |

(Continued)

(52) U.S. Cl.
CPC ......... *B29C 49/6418* (2013.01); *B29C 49/6409* (2013.01); *B29C 49/68* (2013.01); *B29C 49/78* (2013.01); *B29C 49/06* (2013.01); *B29C 49/4284* (2013.01); *B29C 49/46* (2013.01); *B29C 2049/4635* (2013.01); *B29C 2949/78151* (2013.01); *B29C 2949/78462* (2013.01); *Y02P 70/267* (2015.11); *Y02P 70/275* (2015.11)

(58) Field of Classification Search
CPC .. B29C 31/08; B29C 31/004; B29C 49/6409; B29C 49/6436; B29C 49/68; B29C 49/786

USPC .............................. 264/454; 425/174.4, 126.1
See application file for complete search history.

(56) References Cited

U.S. PATENT DOCUMENTS

| | | | | |
|---|---|---|---|---|
| 3,627,282 | A | * 12/1971 | Kinslow, Jr. .................... | 432/11 |
| 3,830,893 | A | 8/1974 | Steingiser | |

(Continued)

FOREIGN PATENT DOCUMENTS

| | | |
|---|---|---|
| DE | 25 45 134 A1 | 4/1977 |
| DE | 39 08 219 A1 | 9/1990 |

(Continued)

OTHER PUBLICATIONS

German search report dated Jun. 1, 2011 in priority application No. 10 2010 049 404.6.

(Continued)

*Primary Examiner* — Timothy Kennedy
(74) *Attorney, Agent, or Firm* — Oppedahl Patent Law Firm LLC

(57) ABSTRACT

An apparatus for the conditioning of plastics material preforms with a tempering space for receiving a plurality of plastics material pre-forms, with a supply device a removal device, and a conveying device which conveys the plastics material pre-forms from the supply device to the removal device in such a way that each plastics material pre-form remains in the tempering space for a preset duration of the dwell period. The temperature of the plastics material pre-forms upon leaving the removal device is substantially constant irrespective of a duration of the dwell period of the plastics material pre-forms in the tempering space and the conveying device is designed in such a way that each plastics material perform remains in the tempering space for a period of time of at least five minutes.

18 Claims, 4 Drawing Sheets

(51) Int. Cl.
*B29C 49/06* (2006.01)
*B29C 49/42* (2006.01)
*B29C 49/46* (2006.01)

(56) References Cited

U.S. PATENT DOCUMENTS

| | | | | |
|---|---|---|---|---|
| 3,850,566 | A | * | 11/1974 | Moore ........................... 425/526 |
| 3,930,788 | A | * | 1/1976 | Daane et al. .................. 432/124 |
| 4,117,050 | A | | 9/1978 | Appel et al. |
| 5,718,853 | A | * | 2/1998 | Ingram ........................ 425/526 |
| 5,772,951 | A | * | 6/1998 | Coxhead ................. B29C 31/00 264/532 |
| 6,422,379 | B1 | * | 7/2002 | Zoppas ........................ 425/534 |
| 2004/0016749 | A1 | * | 1/2004 | Miyazawa et al. ............. 219/553 |
| 2006/0186582 | A1 | * | 8/2006 | Scheid ........................... 264/535 |
| 2009/0297648 | A1 | * | 12/2009 | Sicilia ........................... 425/112 |

FOREIGN PATENT DOCUMENTS

| | | |
|---|---|---|
| DE | 3908219 A1 | 9/1990 |
| DE | 41 05 403 C2 | 8/1992 |
| DE | 42 12 248 A1 | 10/1993 |
| EP | 0736367 | 10/1996 |
| EP | 1 704 040 B1 | 5/2008 |
| FR | 2182010 A | 7/1973 |

OTHER PUBLICATIONS

Translation of abstract for DE3908219A1, Sep. 20, 1990.

* cited by examiner

APPARATUS AND METHOD OF PRODUCING PLASTICS MATERIAL CONTAINERS

The present application claims priority from German patent application number 10 2010 049 404.6 filed Oct. 26, 2010, which application is hereby incorporated herein by reference for all purposes.

The present invention relates to an apparatus and a method of producing plastics material containers. Apparatus and methods of this general type have long been known from the prior art. In this case plastics material pre-forms are usually first heated in a furnace and are then shaped to form plastics material containers by means of a blow molding device, such as for example a stretch blow molding machine. Problems arise for example if problems arise in a unit, such as for example a labelling machine, arranged downstream of the shaping device, and if the shaping procedure has to be interrupted. An interruption of the conveying of the plastics material pre-forms by the heating device can lead to individual plastics material pre-forms becoming overheated and being destroyed in this way. In addition, plastics material pre-forms once heated in the heating device cannot be cooled again and heated a further time, and so these plastics material pre-forms go to waste.

A pre-treatment of plastics material pre-forms before a blow molding procedure is known from EP 0 736 367 B1. In this case a pre-conditioning unit is provided which is traversed by the plastics material pre-forms and which is arranged in such a way that exactly the same heat is introduced into each plastics material pre-form. In this case, during the conveying, the plastics material pre-forms are put in groups of three in each case onto conveying units and are conveyed through the pre-conditioning unit with these conveying units. In this way it can be made possible in a very short time for the plastics material pre-forms to be at substantially the same temperature.

Nevertheless, the apparatus described in EP 0 736 367 B1 is relatively complicated technically and, in particular, the conveying system is relatively expensive.

DE 10 2008 014 215 A1 describes an apparatus for heating plastics material pre-forms. In this case the plastics material pre-forms are first pre-heated in order to be subsequently heated again in a more energy-efficient manner with a microwave heating device.

A magazine for pre-forms is known from DE 30 20 150 C2. This magazine has a closed housing with vertical lateral walls, and openings for the introduction of hot air kept at a constant temperature by means of a temperature regulating device in order to pre-heat the plastics material pre-forms in a heating zone of the magazine.

The object of the present invention is to make available a facility for the conditioning of plastics material pre-forms, which also permits a uniform heating or conditioning of the plastics material pre-forms even at the most widely varying starting temperatures of the latter.

In addition, it should be possible for this conditioning to be carried out irrespectively of whether the plastics material pre-forms arrive at the conditioning device starting from a production device or starting from very low or very different initial temperatures.

SUMMARY OF THE INVENTION

An apparatus according to the invention for the conditioning, in particular the thermal conditioning, of plastics material pre-forms has a tempering space for receiving a plurality of plastics material pre-forms as well as a supply device in order to supply the plastics material pre-forms to the tempering space. In addition, the apparatus has a removal device in order to move the plastics material pre-forms out of the tempering space, as well as a conveying device which conveys the plastics material pre-forms from the supply device to the removal device in such a way that each plastics material pre-form remains in the tempering space for a pre-set duration of the dwell period.

According to the invention a temperature of the plastics material pre-forms leaving the removal device is substantially constant irrespective of a duration of the dwell period of the plastics material pre-forms in the tempering space and the conveying device is designed in such a way that each plastics material pre-form remains in the tempering space for a period of time of at least 5 minutes.

Whereas reference is made in EP 0 736 367 B1 mentioned above to the fact that the plastics material pre-forms are conditioned only over a relatively short period of time such as from one and a half to two minutes, it is proposed in the scope of the present invention that this period of time should be extended to at least 5 minutes. It is advantageous for the plastics material pre-forms to remain inside the tempering space for a period of time of at least 7 minutes, in an exemplary manner of at least 10 minutes, in a particularly exemplary manner of at least 12 minutes, and in a still more particularly exemplary manner of at least 15 minutes.

On account of this period of time, which is considerably increased as compared with the prior art, it is made possible for the pre-forms leaving the apparatus to be at the same temperature in each case, irrespectively of how long they have remained individually inside the tempering space and also at which initial temperature they were supplied to the tempering space. This is true even if the initial temperatures are considerably different. In addition, it is possible in this way for the apparatus for conditioning also to be used as a buffer for the plastics material pre-forms since no further damage to the plastics material pre-forms occurs even in the case of considerably longer times of the duration of the dwell period.

In this way, it is desirable for the apparatus for conditioning, as described here, also to allow an injection molding machine for producing plastics material pre-forms to be coupled to a stretch blow molding machine, in which case the apparatus according to the invention performs four tasks to this end, namely firstly to bridge the path between the injection molding machine and the stretch blow molding machine, in addition to rectify clock-timed to continuous running, in addition to maintain an energy and heat level and finally possibly also to decouple in the event of failure of one of the two machines.

To this end the apparatus according to the invention mentioned above advantageously has a tempered conveying system or a conveying device which in a particularly exemplary manner has a separation means and a supply channel. These plastics material pre-forms can be supplied by way of the supply device and the tempered plastics material pre-forms can be removed by way of the removal device.

In addition, a feedback unit can also be provided which feeds superfluous plastics material pre-forms for example back into an inlet again. In this way, as mentioned above, the system is designed in such a way that the plastics material pre-forms have a long duration of the dwell period in the tempering space or in the tempering region, which in constant operation is at least 5 minutes, or at least 6 minutes, or at least 8 minutes, and in a particularly exemplary manner at least from 10 to 15 minutes, in which case the duration of the dwell period can be dependent upon a dimension and/or a throughput of the tempering region. This has the consequence that, independently of the temperature at which the plastics material pre-forms arrive in the tempering space and irrespective of how long they are in it, they can be delivered at always approximately the same temperature and thus enter always at the same temperature a blow molding machine arranged downstream.

In this case the deviation from the nominal temperature depends upon the duration of the dwell period and the flow speed in the tempering space, as well as, in addition, the entry and exit temperatures. The apparatus is designed in such a way (in particular with respect to the dimension and the conveying speed of the conveying device) that the duration of the dwell period is at least so long that even in the event of a pronounced fluctuation of the entry temperature there is only a slight deviation at the outlet. A deviation in the range of +/−0 degrees would be ideal, but this would theoretically involve a residence time of infinite length in the tempering space.

For a deviation in the range of +/−2 degrees, depending upon the marginal conditions a duration of the dwell period of from 10 to 25 minutes is necessary (in this case a hot air throughput of at least 500 m$^3$/h, or between 800 and 2,000 m$^3$/h is taken as a basis and as high a flow speed as possible (of the air to be heated or tempered) of up to 15 m/s.

In the case of an exemplary embodiment the temperature of the plastics material pre-forms leaving the removal device is substantially independent of a temperature of the plastics material pre-forms supplied to the tempering space by way of the supply device. This too, as mentioned above, is attained by way of the relatively long duration of the dwell period of the plastics material pre-forms. In this case "substantially independent" is to be understood as being that the temperatures of the individual plastics material pre-forms differ from one another by not more than 6K, or by not more than 5K, or by not more than 4K, or by not more than 3K, and in a particularly exemplary manner by not more than 2K.

In the case of an advantageous embodiment the conveying device conveys the plastics material pre-forms non-sorted at least locally through the tempering space. This is to be understood as being that the plastics material pre-forms are conveyed for example in bulk through the tempering space. It is desirable, however, for the conveying to be carried out in such a way that the longitudinal directions of the plastics material pre-forms conveyed non-sorted are orientated in more than one direction and in an exemplary embodiment are distributed in a substantially statistical manner. As a result, a considerable simplification of the apparatus is achieved and, in addition, the apparatus can also act as a buffer store for the plastics material pre-forms in this way.

In the case of a further advantageous embodiment the apparatus has a flow generation device which in the tempering space generates an air flow with which it is possible to act upon the plastics material pre-forms. This flow generation device can be for example fans and the like which generate a directed flow of the air or in general a gaseous medium inside the apparatus according to the invention. It would also be possible for sterile air or even a sterilization gas, which not only thermally conditions but also sterilizes the plastics material pre-forms, to be used instead of conventional air.

The time required for the thermal conditioning is reduced by the generation of the air flow.

In the case of a further advantageous embodiment the apparatus has a sensor device for determining a temperature inside the tempering space. In particular, in this case the sensor device determines a temperature of the air situated in the tempering space. In addition, a regulating device can be provided which also permits a setting of this temperature inside the tempering space.

In the case of a further advantageous embodiment the apparatus has conveying regions extending adjacent to one another. In this way, it is possible for the apparatus according to the invention or the tempering space respectively to be made comparatively small. In this case these conveying regions can be made laterally adjacent to one another and/or offset vertically or even in a spiral shape. In this way it would be possible for a plurality of conveyor belts to be arranged inside the tempering space and for the plastics material pre-forms to drop or move in some other way from one conveyor belt to the next conveyor belt. In particular, the conveying device does not extend along a straight line inside the tempering space.

In the case of a further advantageous embodiment the conveying device has a conveyor belt on which the plastics material pre-forms are conveyed through the tempering space. In addition, a plurality of conveyor belts can also be provided, for example conveyor belts—in particular thermally insulated—which are arranged one above the other and which are acted upon with hot air in a regulated manner. In this case these conveyor belts can be designed in such a way that it is also possible for the plastics material pre-forms to be acted upon with hot air from below. It is possible for all the conveying units or only individual conveying units of the conveying device to be fed with one or more tempering devices. This can be carried out for example in a manner dependent upon an initial temperature of the plastics material pre-forms on the supply device.

The present invention further relates to a plant for the treatment of plastics material pre-forms with an apparatus of the type described above, as well as an apparatus—arranged downstream of this apparatus in a conveying direction of the plastics material pre-forms—for shaping the plastics material pre-forms to form plastics material containers. In this case a first heating device for heating the plastics material pre-forms is arranged between the apparatus for shaping the plastics material pre-forms and the apparatus for the conditioning as described above.

This heating device can be for example a furnace which heats the plastics material pre-forms to a temperature which is suitable for shaping the plastics material pre-forms. In contrast, the temperature which is reached in the apparatus for the conditioning according to the invention is for example considerably below this temperature, i.e. a temperature which is for example in the range of between 30° and 70°, or between 40° and 60°, and in a particularly exemplary manner between 45° and 55°. It is desirable that the temperature to be below the glass transition temperature of the material of the plastics material pre-form and desirably at least 5° below the glass transition temperature. In this way, it is possible, even if the plastics material pre-forms are not subsequently shaped to form plastics material containers after leaving the apparatus for the conditioning, for them to be capable of being used again.

In the case of an advantageous embodiment the apparatus has a connecting line which conveys heated air from the heating device and/or the apparatus for shaping the plastics material pre-forms to form plastics material containers to the apparatus according to the invention. In this case in this embodiment the apparatus according to the invention is advantageously operated with the waste air of at least one of the two plants named above.

In the case of a further advantageous embodiment the plant according to the invention has a production device for producing the plastics material pre-forms. This can be for example an injection molding machine which produces the plastics material pre-forms from a raw mass. In this case it is advantageous for this apparatus for producing plastics material pre-forms to be arranged immediately upstream of the apparatus according to the invention. It is desirable for the conditioning apparatus according to the invention to be capable of being optionally equipped by the production device or by a reservoir with plastics material pre-forms. If the plastics material pre-forms, starting from a production device, arrive at the apparatus according to the invention, they are generally at a higher temperature than is present in the tempering space mentioned above. In this case the apparatus according to the invention is used as a cooling device for the plastics material pre-forms.

It would additionally be possible for a further heating device, through which the plastics material pre-forms are likewise conveyed and in which the plastics material pre-forms are tempered to a precise uniform temperature, to be provided between the apparatus for conditioning according to the invention and the heating device mentioned above.

The present invention further relates to a method of producing plastics material containers, in which plastics material pre-forms are heated and are then shaped in a shaping device to form plastics material containers and in which the plastics material pre-forms are conditioned thermally before the heating. In this case the plastics material pre-forms are conveyed by means of a conveying device through a tempering space to the apparatus for the conditioning. According to the invention the plastics material pre-forms are present in the tempering space for a period of at least 5 minutes. It is thus also proposed with respect to the method that the plastics material pre-forms should remain in the tempering space for a specified time (a minimum of 5 minutes) in order to leave it at a substantially constant equal temperature in this way.

It is desirable for the tempering space to have air flow through it. In this case the through-flow can take place in the conveying direction of the plastics material containers, in a direction opposed thereto, or even in other directions. It is advantageous for the plastics material pre-forms to be conveyed non-sorted at least locally through the tempering space and, in a particularly exemplary manner, on at least one conveyor belt.

In the case of a further advantageous embodiment the apparatus is acted upon with waste air from a heating device which is situated upstream of the shaping device and/or with waste air from the shaping device itself.

It is advantageous for a position of the plastics material pre-forms to be altered at least for a time with respect to an air flow for tempering purposes. This can be carried out for example by the plastics material pre-forms passing or dropping from a first conveying device onto a second conveying device or even by being moved in a direction opposed to their conveying device in a purposeful manner by turning devices and/or shaking devices inside the apparatus for the conditioning.

It is advantageous for the plastics material pre-forms to be conveyed in a variable geometrical position with respect to one another. In the case of a further advantageous embodiment the plastics material pre-forms are heated once more after leaving the apparatus for the conditioning. In the case of a further advantageous embodiment the plastics material pre-forms are heated once more before they arrive in the apparatus for the conditioning. It would also be possible, however, for the plastics material pre-forms to arrive in the apparatus for the conditioning immediately after they have been finished or produced.

DESCRIPTION OF THE DRAWING

Further advantageous embodiments are evident from a drawing in several figures, of which.

DETAILED DESCRIPTION

Figure 1:
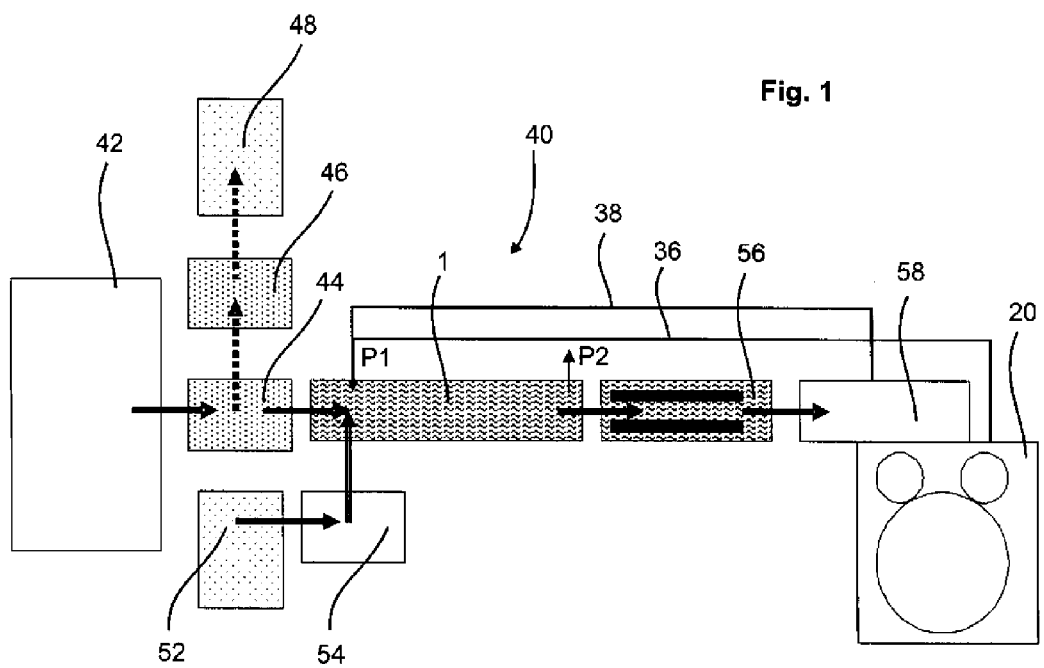
FIG. 1 is an illustration in the manner of a block diagram of a plant according to the invention for the treatment of containers.

FIG. 1 is an illustration in the manner of a block diagram of a plant 40 for the treatment of plastics material containers. In this case an injection molding machine 42 is provided here which produces the plastics material pre-forms and delivers them first of all to a first cooling device 44. If the plastics material pre-forms produced are not to be immediately further processed, they can be delivered to a magazine or store 48 of plastics material pre-forms by way of a second cooling device 46. If the plastics material pre-forms are to be formed into plastics material containers immediately after that, they are first transferred to an apparatus for the conditioning 1 according to the invention or are conveyed through this apparatus.

Inside the apparatus 1 the plastics material pre-forms are acted upon with heated air which is supplied in the direction of the arrow P1 and is removed in the direction of the arrow P2. It would also be possible, however, for the flow to be guided in the opposite direction, so that the air flows from the interior of the apparatus 1 in a direction opposed to the conveying direction P of the plastics material pre-forms. The apparatus 1 is adjoined by a tempered separating device 56 in which the plastics material pre-forms are separated on the one hand and are brought to an equal temperature level on the other hand. After that, the heated plastics material pre-forms are supplied to a shaping device 20 such as for example a stretch blow molding machine. In this case this stretch blow molding machine has in turn a heating device 58 in which the plastics material pre-forms are brought to a temperature which is suitable for the shaping procedure.

Alternatively, it would also be possible for the plastics material pre-forms to be supplied from a magazine or a plastics material store 52, optionally by way of a pre-heating unit 54, to the apparatus 1 according to the invention. The first cooling device 44, i.e. the after-cooling station, is usually a component part of the injection molding machine 42 and cools the plastics material pre-forms to a temperature of approximately 70°, so that they are not damaged or deformed during the following conveying.

In the apparatus 1 according to the invention or in the tempering space the plastics material pre-forms advantageously lie non-sorted in the manner of bulk material on a conveyor belt or a similar conveying system and they are cooled or heated with a defined air flow (which can be directed optionally in or contrary to the conveying movement of the plastics material pre-forms). On account of the long duration of the dwell period the temperatures of the plastics material pre-forms approach a controlled circulation temperature in an asymptotic manner. In this case the system can comprise for example one or more thermally insulated conveyor belts which are acted upon in a regulated manner with heated air. Reference number T relates to a conveying direction of the plastic preforms 10.

The reference number 36 relates to a line by which waste air can be conveyed out of the shaping device 20 to the apparatus 1, and the reference number 38 relates to a line by which waste air can be conveyed out of the heating device 58 to the apparatus 1. In this case it would also be possible for the lines 36 and 38 to open into a common collecting line and for a mixing device to be provided which by the respective mixing ratios regulates the temperature of the air flowing into the apparatus 1.

Figure 2:
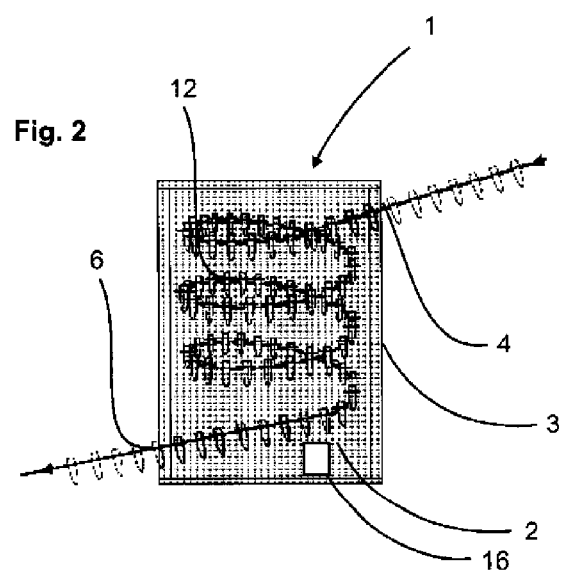
FIG. 2 is a diagrammatic illustration of an apparatus according to the invention for the conditioning of plastics material pre-forms.

FIG. 2 shows a possible embodiment of a conditioning apparatus 1 according to the invention. In this case the plastics material pre-forms are conveyed along a spiral path from a supply device 4 through a tempering space 2 and are removed from the tempering space 2 again by way of a removal device 6. The reference number 12 relates to a guide rail along which the plastics material pre-forms slide through the tempering space 2 also under the action of gravity. In this case it is also possible for the conveying path inside the tempering space 2 to be designed in the form of an accumulation path, so that the tempering space 2 or the apparatus 1 can also act as a buffer.

In addition, it would also be possible for the tempering path discussed above to be formed from a plurality of conveying units which are arranged one above the other or adjacent to one another and which are connected to one another. In this case it is desirable for all the portions or only individual portions to be fed by a tempering unit. The apparatus shown in FIG. 2 can also, however, act as an ascending conveyor.

In this case it is advantageous for the system to be designed to be as compact as possible and, in addition, also for the outer faces 3 to be insulated in order to keep the energy requirement to a minimum. It is desirable for the air tempered in a controlled manner to be conveyed in a circuit in the interior of the tempering space 2 or to be fed back again into the flow line by way of a circulating air heat exchanger described in detail below or a circulating air mixer, in order to lose as little energy as possible to the environment.

In this way, it would be possible for the tempering space 2 to be fed with waste heat from the furnace, a microwave heating means, a compressor, a compression cooler or the like. The reference number 16 designates roughly diagrammatically a sensor device which detects a temperature inside the tempering space 2, or expressed in more precise terms, a temperature of the air in the tempering space 2. It would also be possible for a plurality of sensor devices 16 of this type to be provided. In addition, a control device or regulating device can also be provided (not shown) which carries out a control or regulation of the temperature inside the tempering space 2 in reaction to measured temperatures.

Figure 3:
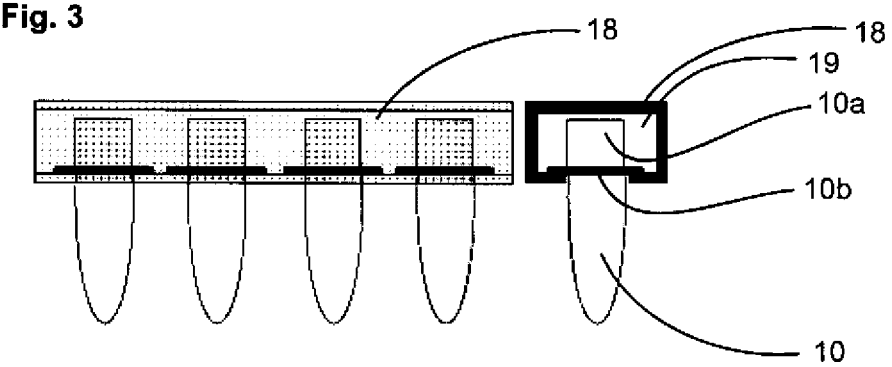
FIG. 3 is a diagrammatic illustration of a guide system for plastics material pre-forms.

FIG. 3 is an illustration to explain the conveying of the pre-forms. In the case of this embodiment the plastics material pre-forms in a guide rail 18 are gripped below their support ring 10b and are conveyed in this way. In addition, it would also be possible for the region 19 to be acted upon with cooler air so as to treat a thread 10a of the plastics material pre-forms still more gently in this way.

Figure 4:
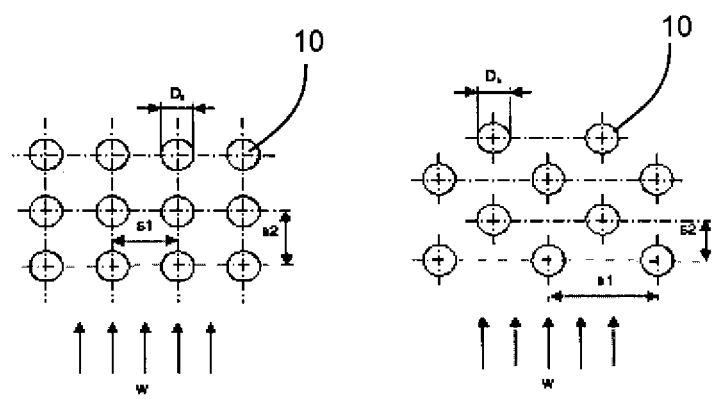
FIG. 4 shows a possible distribution for the plastics material pre-forms inside the tempering space.

FIG. 4 shows two possible designs of the conveying or the structured arrangement of the plastics material pre-forms 10 inside the tempering space. In this case the arrows w relate to the supply of heated air. In the case of the left-hand design the plastics material pre-forms are situated in alignment with one another and in the case of the right-hand design they are offset one behind the other.

Figure 5:
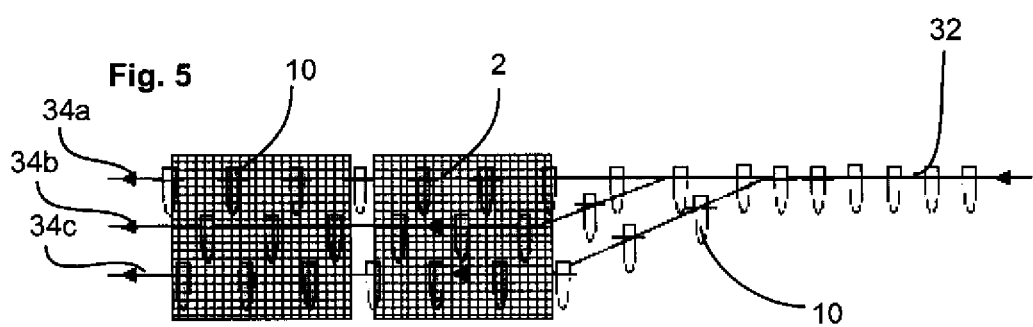
FIG. 5 is a further illustration for conveying the plastics material pre-forms through the tempering space.

FIG. 5 shows a further arrangement of an apparatus according to the invention. In this case the plastics material pre-forms are conveyed from one path 32 for example to three paths 34a, 34b and 34c or more and are conveyed on these three paths through the tempering space 2.

It is possible for the plastics material pre-forms to be supplied separately, but a conventional supply can also be used which is enclosed and is kept at the nominal temperature of the plastics material pre-forms. In the case of this design the plastics material pre-form should no longer be heated or cooled, but should only keep its temperature.

The shaping device 20 shown in FIG. 1 can, as mentioned above, manage with a smaller profiling furnace as compared with the prior art, since significantly less energy is used for heating the plastics material pre-forms.

The second cooling device 46 (FIG. 1) can also be used, in the event of a prolonged disruption at the blow molding machine or in the event that other plastics material pre-forms are produced on the injection molding machine 42 than are required on the shaping device 20, in order to cool the plastics material pre-forms to a sufficiently low temperature for the plastics material pre-forms to be capable of being transferred into the store 48 without problems. In the store 48 the plastics material pre-forms can be stored in crates or the like, but so-called pre-form silos would also be possible.

The conveying device 54 is used in particular in the event of a failure of the injection molding machine 42 or in the event that other plastics material pre-forms are processed on the shaping device than are produced just on the injection molding machine 42. In this case the plastics material pre-forms can, if necessary, be taken from a store 52 of plastics material pre-forms and can be pre-heated. In addition, it would also be possible for the pre-heating unit 54 to be incorporated in the apparatus 1 according to the invention. It is also possible for cold plastics material pre-forms from octabins or the like to be supplied, if necessary, from the store 52.

In the event of a disruption the conveying device 12 remains in the tempering space 2. On account of the fact that the plastics material pre-forms are brought to the ambient temperature in an asymptotic manner in the tempering space 2, they cannot overheat but at most adopt the temperature of the surrounding air which is tempered in a controlled manner.

In addition, it is possible for the plastics material pre-forms in the tempering space 2 and/or in the supply to be arranged in a structured manner as shown in FIG. 4 on a conveying device. In this case the distance s1 of the plastics material pre-forms as shown in FIG. 4 should advantageously be kept as small as possible and the distance s2 should be set for example to lengths in the range of between 30 and 60 mm, or between 40 and 50 mm, in a particularly exemplary manner in the range of 44 mm. The deviation from the nominal temperature and the duration of the dwell period and thus the overall energy consumption can be reduced in this way. In addition, it would be possible, in the case of a structured arrangement, for the openings to be separated off, as shown in FIG. 3, in order to prevent unnecessary heat input.

It would also be possible for a tempering in the tempering space 2 to be used only in order to equalize the starting conditions of normal plastics material pre-forms of for example 0 degrees from outside in winter and 40 degrees adjacent to the furnace and to bring them to a constant starting temperature of 45 degrees.

Figure 6A:
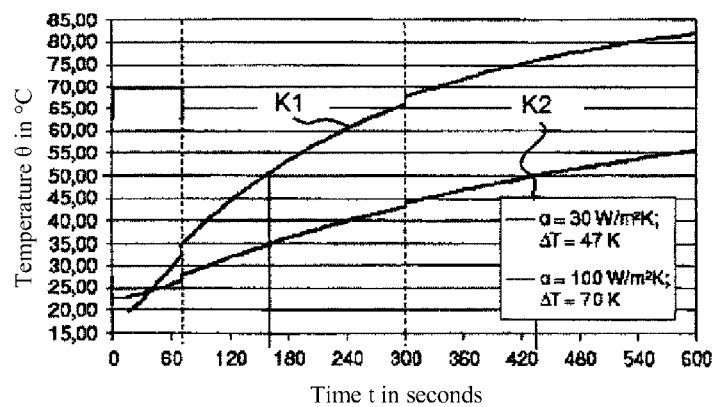
FIGS. 6a-6c are three diagrams to illustrate a temperature pattern of the plastics material pre-forms.
Figure 6B:
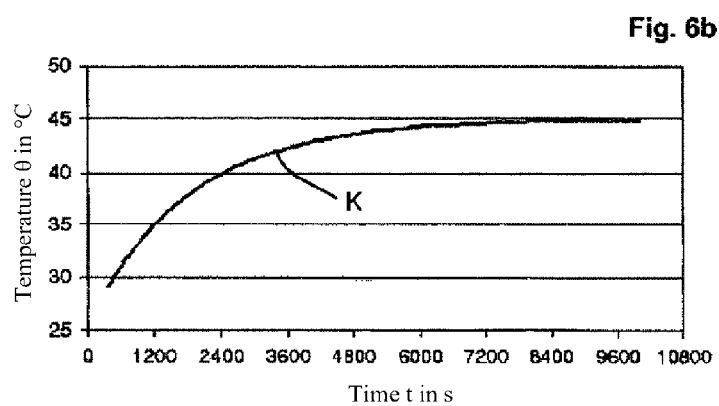
Figure 6C:
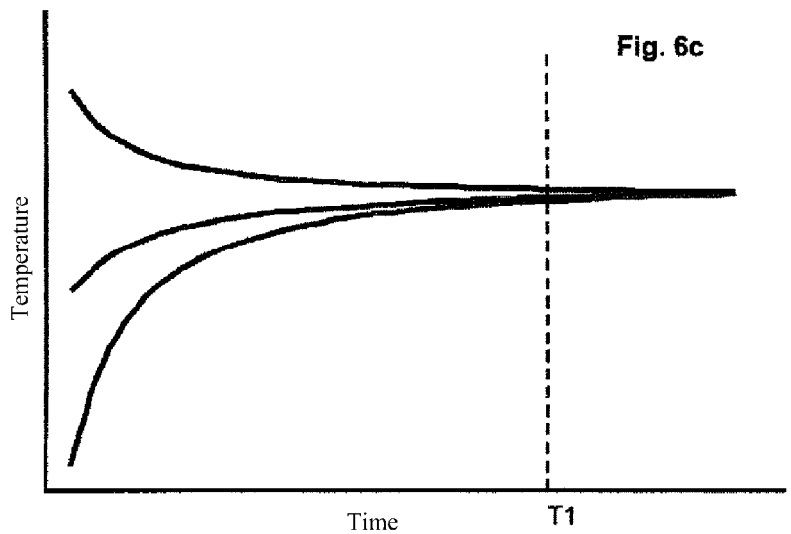

FIGS. 6a to 6c show possible temperature patterns of the plastics material pre-forms with a wall thickness of 4 mm over the duration of the heating of the outer wall. FIG. 6a shows an example of forced convection. It is evident that a temperature difference of 70 K (curve K1) or an increase in temperature of from 20° C. to 90° C. is substantially achieved in a time frame of approximately 10 minutes. If, as indicated by the curve K2, a temperature difference of 47 K is to be achieved, this is also possible in a time period of approximately 10 minutes. FIG. 6b shows the same procedure in the case of free convection. It is evident that in this case substantially longer periods of time are necessary in order to achieve a heating to the ambient temperature of 45° C. As is evident from the curve K, a temperature in the range of 45° C. is achieved only after approximately 3 h.

FIG. 6c shows three possible temperature patterns, in which it is evident that the temperatures of the plastics material pre-forms have converged with one another very closely essentially independently of the starting temperature at a specified time T1, in which case the fluctuations still existing can also be accepted for the processes to be pursued.

It would also be possible for the apparatus according to the invention to be used only in order to improve the overall energy balance of a stretch blow molding plant. In this case the injection molding plant can be omitted completely and instead the operation is carried out with the "pre-form store supply", as described above, with plastics material pre-forms injection molded at another location at room temperature. Although no residual heat is used from the preceding process in this case, the heating of the tempering path is possible with substantially less outlay and also with less energy input, since more time is available for the introduction of the energy. The convective heat input by way of hot air and the thermal conduction is considerably better in terms of efficiency than the introduction of energy by means of infrared radiation on a short path. In this way, the overall efficiency of the plant is improved and the less efficient infrared heating path can be shortened with respect to a standard stretch blow molding plant.

The deviation of the nominal temperature is lowered to a minimum after tempering in the pre-heating path by tempering and insulation of the separating means and supply rail to the blow molding device. The temperature distribution in and between the plastics material pre-forms is subsequently homogenized by a structured arrangement of the plastics material pre-forms in the supply to the blow molding device.

In order to reduce the deviation of the nominal temperature further it is expedient to mix the plastics material pre-forms during the conveying through the tempering path in a permanent manner or at diverse time intervals in order to change the position of the individual plastics material pre-forms in the hot air flow. This can take place for example by way of a stirring unit or even by way of a shaking apparatus or even a shifting during the conveying between a plurality of conveyor belts.

Figure 7A:
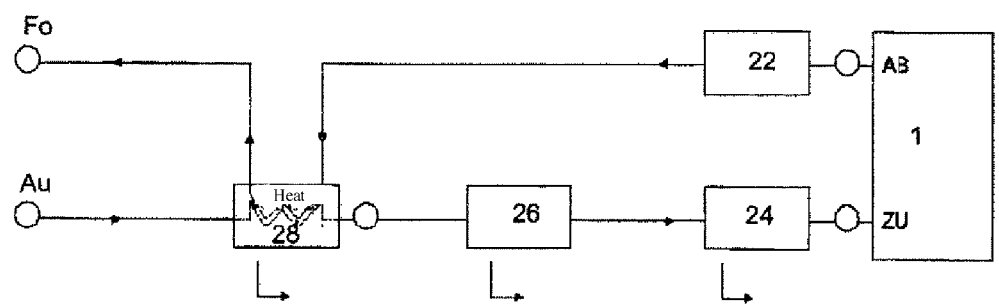
FIGS. 7a-7b are two illustrations to explain the air tempering for an apparatus according to the invention.
Figure 7B:
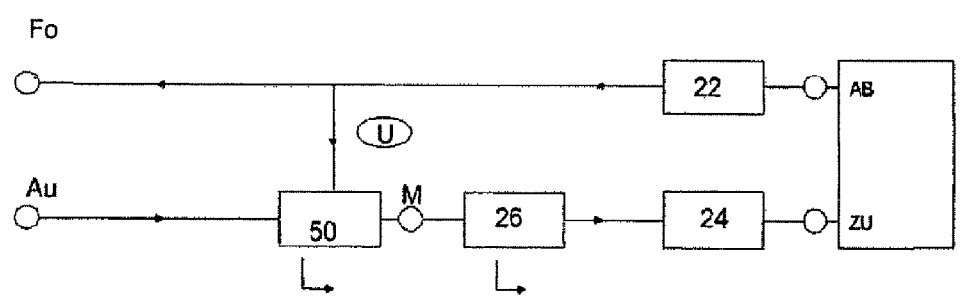

FIGS. 7a and 7b are two illustrations to explain the heat recovery. In this case it is possible for example for outside air AU to be supplied to a heat exchanger 28, this heat exchanger 28 also being integrated in the heat circuit with the apparatus 1 according to the invention. The reference number 22 designates a fan unit which, in the same way as a further fan unit 24 supplies heated air to the apparatus 1 or the tempering space 2 and also removes it again. In addition, a pre-heating means 26 for pre-heating the air supplied to the apparatus 1 can be provided. This pre-heating means 26 can also be a water/air/heat exchanger and the fan units 22, 24 can also be axial fans. On account of a recovery of the heat content of the waste air AB it is possible to achieve a considerable reduction of the energy consumption. In this case this waste air AB is supplied to the heat exchanger 28 mentioned above. The reference ZU relates to the supply air.

In this way, in the case of the variant shown in FIG. 7a, a recovery of heat takes place by way of the circulating air heat exchanger 28.

FIG. 7b shows a further variant, in which the recovery of heat takes place by way of an admixture of circulating air. For this purpose a mixing unit 50 is provided in place of the heat exchanger 28. In the mixing chamber of this mixing unit a certain amount of discharge air FO is admixed with the outside air in order to reduce the energy consumption of the after-heating means as a result, in order to save energy in this way. The reference U relates in this case to circulating air and the reference M relates to mixed air.

Whereas the pre-heating output is 69 or 67 KW during the procedure shown in FIGS. 7a and 7b, without this recovery of heat 102 kW of pre-heating output are required.

LIST OF REFERENCES 1 apparatus
2 tempering space
3 outer face
4 supply device
6 removal device
10 plastics material pre-form
10a thread
10b support ring
12 conveying device
16 sensor device
18 guide rail
19 region
20 shaping device
22, 24 fan units
26 pre-heating means
28 heat exchanger
32 path
34a, 34b, 34c paths
36 line to the waste air supply from the shaping device
38 line to the waste air supply from the heating device
40 plant
42 injection molding machine
44 first cooling device
46 second cooling device
48 store of plastics material pre-forms
50 mixing unit
52 store of plastics material pre-forms
54 pre-heating unit
56 separating device
58 heating device
K, K1, K2 curves
T1 temperature
AB waste air
ZU supply air
FO discharge air
U circulating air
M mixed air
T conveying direction
P1, P2 arrows
w air flow
s1, s2 distance

The invention claimed is:
1. An apparatus for use with plastics material pre-forms and with respect to a dwell period, the apparatus comprising:
a tempering space for receiving a plurality of plastics material pre-forms,
a supply device in order to supply the plastics material pre-forms to the tempering space, a removal device in order to remove the plastics material pre-forms out of the tempering space, and a conveying device which conveys the plastics material pre-forms from the supply device to the removal device in such a way that each plastics material pre-form remains in the tempering space for a pre-set duration of the dwell period, wherein a temperature of the plastics material pre-forms leaving the removal device is substantially constant irrespective of the duration of the dwell period of the plastics material pre-forms in the tempering space and the conveying device is designed with respect to dimension and conveying speed of the conveying device in such a way that each plastics material pre-form remains in the tempering space for a period of time of at least 5 minutes;

wherein the conveying device conveys the plastics material pre-forms non-sorted at least locally through the tempering space;

wherein the plastics material pre-forms lie non-soiled in the manner of bulk material in direct contact with the conveying device; and wherein the plastics material pre-forms are cooled or heated with a defined air flow.

2. The apparatus according to claim 1, wherein the temperature of the plastics material pre-forms leaving the removal device is independent of a temperature of the plastics material pre-forms supplied to the tempering space by way of the supply device.

3. The apparatus according to claim 1, wherein the apparatus has a flow generation device which in the tempering space generates an air flow with which it is possible to act upon the plastics material pre-forms.

4. The apparatus according to claim 1, wherein the apparatus has a sensor device for determining a temperature inside the tempering space.

5. The apparatus according to claim 1, wherein the conveying device has conveying regions extending adjacent to one another.

6. The apparatus according to claim 1, wherein the conveying device has a conveyor belt on which the plastics material pre-forms are conveyed through the tempering space.

7. The apparatus according to claim 1 further comprising a shaper, arranged downstream of the tempering device in a conveying direction of the plastics material pre-forms, for shaping the plastics material pre-forms to form plastics material containers, wherein a first heating device for heating the plastics material pre-forms is arranged between the apparatus for shaping the plastics material pre-forms and the tempering device.

8. The apparatus according to claim 7, further comprising a connecting line which conveys heated air from the first heating device and/or the apparatus for shaping the plastics material pre-forms to form plastics material containers to the apparatus such that the apparatus for use with plastics material pre-forms is operated with air from the first heating device and/or the apparatus for shaping the plastics material pre-forms to form plastics material containers.

9. The apparatus according to claim 7, further comprising a production device for producing the plastics material pre-forms.

10. An apparatus according to claim 1, wherein the conveying device is designed such that each plastics material pre-form remains in the tempering space for a period of time of at least 10 minutes.

11. An apparatus according to claim 1, wherein the conveying device does not extend along a straight line inside the tempering space.

12. An apparatus according to claim 1, wherein conveying regions of the conveying device are laterally adjacent to one another.

13. An apparatus according to claim 1, wherein conveying regions of the conveying device are offset vertically.

14. An apparatus according to claim 1, wherein the conveying device has at least one conveyor belt.

15. An apparatus according to claim 1, wherein the conveying device has a plurality of conveyor belts.

16. An apparatus according to claim 1, wherein a tempering path inside the tempering space is formed from a plurality of conveying units, which are arranged one above the other or adjacent to one another.

17. An apparatus for use with plastics material pre-forms and with respect to a dwell period, the apparatus comprising:
a tempering space for receiving a plurality of plastics material pre-forms,
a supply device in order to supply the plastics material pre-forms to the tempering space,
a removal device in order to remove the plastics material pre-forms out of the tempering space, and
a conveying device which conveys the plastics material pre-forms from the supply device to the removal device in such a way that each plastics material pre-form remains in the tempering space for a pre-set duration of the dwell period, wherein a temperature of the plastics material pre-forms leaving the removal device is substantially constant irrespective of a duration of the dwell period of the plastics material pre-forms in the tempering space and the conveying device is designed with respect to dimension and conveying speed of the conveying device in such a way that each plastics material pre-form remains in the tempering space for a period of time of at least 5 minutes;
wherein the conveying device comprises a guide rail, along which the pre-forms in direct contact with the rails slide through the tempering space also under the action of gravity; and
wherein a conveying path inside the tempering space is designed in the form of an accumulation path, so that the tempering space or the apparatus act as a buffer.

18. An apparatus for use with plastics material pre-forms and with respect to a dwell period, the apparatus comprising:
a tempering space for receiving a plurality of plastics material pre-forms,
a supply device in order to supply the plastics material pre-forms to the tempering space,
a removal device in order to remove the plastics material pre-forms out of the tempering space, and
a conveying device which conveys the plastics material pre-forms from the supply device to the removal device in such a way that each plastics material pre-form remains in the tempering space for a pre-set duration of the dwell period, wherein a temperature of the plastics material pre-forms leaving the removal device is substantially constant irrespective of a duration of the dwell period of the plastics material pre-forms in the tempering space and the conveying device is designed with respect to dimension and conveying speed of the conveying device in such a way that each plastics material pre-form remains in the tempering space for a period of time of at least 5 minutes;
wherein a tempering path inside the tempering space is formed from a plurality of conveying units, which are arranged one above the other, further characterized in that within each of the conveying units the pre-forms are transported along a path extending in a transport direction of each of the conveying units.

* * * * *